United States Patent
Bolding et al.

(10) Patent No.: US 11,201,781 B2
(45) Date of Patent: Dec. 14, 2021

(54) SYSTEMS AND METHODS FOR AUTOMATICALLY CONFIGURING NETWORK ISOLATION

(71) Applicant: Arista Networks, Inc., Santa Clara, CA (US)

(72) Inventors: Allan Frederick Bolding, Half Moon Bay, CA (US); Hemant M. Chaskar, San Jose, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 18 days.

(21) Appl. No.: 16/351,362

(22) Filed: Mar. 12, 2019

(65) Prior Publication Data

US 2020/0295988 A1    Sep. 17, 2020

(51) Int. Cl.
*H04L 12/24* (2006.01)
*H04L 12/46* (2006.01)

(52) U.S. Cl.
CPC ...... *H04L 41/0803* (2013.01); *H04L 12/4641* (2013.01)

(58) Field of Classification Search
CPC .................. H04L 41/0803; H04L 12/4641
See application file for complete search history.

(56) References Cited

U.S. PATENT DOCUMENTS

| | | |
|---|---|---|
| 6,778,542 B1 | 8/2004 | Hassan-Ali et al. |
| 7,016,361 B2 | 3/2006 | Swonk et al. |
| 7,380,025 B1 * | 5/2008 | Riggins ............... H04L 41/0809 710/10 |
| 7,516,211 B1 * | 4/2009 | Gourlay ............. H04L 41/0816 370/356 |
| 9,225,595 B2 | 12/2015 | Gourlay et al. |
| 9,621,511 B2 * | 4/2017 | Premji ................ H04L 41/0886 |
| 2006/0274774 A1 | 12/2006 | Srinivasan et al. |
| 2007/0199061 A1 | 8/2007 | Byres et al. |

(Continued)

FOREIGN PATENT DOCUMENTS

| | | |
|---|---|---|
| EP | 2431883 | 3/2012 |
| EP | 2779531 | 9/2014 |

OTHER PUBLICATIONS

Arista EOS Manual, VXLAN Chapter 20, Arista Networks, Undated, 40 pages.

(Continued)

*Primary Examiner* — William G Trost, IV
*Assistant Examiner* — Monishwar Mohan
(74) *Attorney, Agent, or Firm* — Fountainhead Law Group P.C.

(57) ABSTRACT

The system and methods described herein provided for automatically configuring a network port at a first network device with isolation parameter. A network device receives a network access message that includes network access parameters to be used when a second network device communicates with the first network device. The network device determines network isolation parameter based on the network access parameters to be used for a plurality of network packets received from the second network device. The network device determines whether the port of the network device is configured with the network isolation parameter, and, if not so configured, the network device automatically configures the port with the network isolation parameter.

20 Claims, 9 Drawing Sheets

(56) References Cited

U.S. PATENT DOCUMENTS

| | | | |
|---|---|---|---|
| 2009/0061863 A1 | 3/2009 | Huggett | |
| 2012/0072567 A1 | 3/2012 | Yin et al. | |
| 2012/0078994 A1 | 3/2012 | Jackowski et al. | |
| 2012/0082062 A1 | 4/2012 | McCormack | |
| 2012/0155395 A1 | 6/2012 | Yadav et al. | |
| 2012/0226801 A1 | 9/2012 | Velaga et al. | |
| 2013/0304917 A1* | 11/2013 | Mittal | H04L 63/101 709/225 |
| 2013/0318343 A1* | 11/2013 | Bjarnason | H04L 41/0809 713/157 |
| 2013/0346531 A1 | 12/2013 | Hummel | |
| 2014/0122674 A1* | 5/2014 | Gray | H04L 41/0846 709/222 |
| 2014/0219079 A1* | 8/2014 | Kapadia | H04L 41/0806 370/221 |
| 2014/0244860 A1* | 8/2014 | A.R. | H04L 61/2007 709/245 |
| 2014/0280846 A1* | 9/2014 | Gourlay | H04L 63/0876 709/223 |
| 2015/0003282 A1* | 1/2015 | Gourlay | H04L 41/0806 370/254 |
| 2015/0256413 A1* | 9/2015 | Du | H04L 41/145 370/216 |
| 2016/0306949 A1* | 10/2016 | Tallapaneni | G06F 21/10 |
| 2016/0352574 A1* | 12/2016 | Cudak | H04L 41/0886 |
| 2017/0063986 A1* | 3/2017 | Gopal | H04L 67/1095 |
| 2017/0099160 A1* | 4/2017 | Mithyantha | H04L 67/10 |
| 2017/0374692 A1* | 12/2017 | Currie | H04W 48/02 |
| 2018/0026834 A1* | 1/2018 | Dec | H04L 41/145 709/221 |
| 2018/0063714 A1* | 3/2018 | Stephenson | H04W 12/04 |
| 2018/0302289 A1* | 10/2018 | Shen | H04L 41/12 |
| 2018/0316673 A1* | 11/2018 | Shah | H04W 12/35 |
| 2019/0020684 A1* | 1/2019 | Qian | H04L 63/164 |
| 2019/0028442 A1* | 1/2019 | Pillai | H04L 12/4641 |
| 2019/0068689 A1* | 2/2019 | Ram | H04L 41/08 |
| 2019/0132152 A1* | 5/2019 | Wang | H04L 45/64 |
| 2019/0215191 A1* | 7/2019 | Fu | H04L 61/2592 |
| 2019/0349295 A1* | 11/2019 | Huang | H04L 12/4633 |
| 2020/0044917 A1* | 2/2020 | Peng | H04L 67/1061 |

OTHER PUBLICATIONS

Badman, "Why We're Not All Flocking to Mist and Meraki Wireless: The Layer 2 Situation," https://it.toolbox.com/blogs/leebadman/why-were-not-all-flocking-to-mist-and-meraki-wireless-the-layer-2-situation-101518, Oct. 2018, Retrieved Dec. 6, 2018, 6 pages.

Extreme Defender for IoT; Simple Security for Your Critical Endpoints, Extreme Solution Brief, www.extremenetworks.com, 2019, 5 pages.

Extreme Networks Makes Securing Edge Devices Easy with Defender for IoT; New Technology Works on Any Network to Protect Wired and Wireless Devices from Cyber-Attacks, News Provided by Extreme Networks, Inc., Feb. 4, 2019, 6 pages.

Mahalingam et al., "Virtual extensible Local Area Network (VXLAN): A Framework for Overlaying Virtualized Layer 2 Networks Over Layer 3 Networks," RFC 7348, VXLAN, Aug. 2014, ISSN: 2070-1721, 22 pages.

Overview of Cisco TrustSec; SGT Inline Tagging, Cisco, Undated, 6 pages.

Overview of TrustSec, Cisco, Jan. 2014, 58 pages.

Understanding VXLANs, TechLibrary, Junos OS, EVPN Feature Guide, https://www.juniper.net/documentation/en_US/junos/topics/topic-map/sdn-vxlan.html, Jul. 10, 2018, 10 pages.

U.S. Appl. No. 14/199,813, filed Mar. 6, 2014, Douglas Gourlay.

Ning Jiang et al., "Application of Trusted Boundary Based on Port Trust Value in Campus Area Network", 2010 International Conference on Computational Aspects of Social Networks, IEEE, 2010, pp. 97-100.

* cited by examiner

SYSTEMS AND METHODS FOR AUTOMATICALLY CONFIGURING NETWORK ISOLATION

BACKGROUND

Computer networks typically facilitate communication between multiple computing devices that are operatively connected to one another via one or more network devices. Computing devices often send data to and receive data from other computing devices via the computer network. The present disclosure is directed to automatically configuring network isolation and, more particularly, to automatically configuring network isolation at a network device in response to network access messages.

SUMMARY

Currently, system administrators that want to isolate network traffic at a network device must manually configure the network device to provision the network isolation and create isolation endpoints at network devices. Isolation is, however, a desirable configuration technique useful for many network topologies and scenarios. For example, a system administrator might deploy Wireless Local Area Network (WLAN) Access Points (APs) that support multiple Service Set Identifiers (SSIDs) on the wireless side. These WLAN APs may, for example, span a single campus or multiple campuses, reside within a single layer-2 (L2) network (e.g., a data link layer network), or cross network boundaries over layer-3 (L3) (e.g., the network layer) connections via, for example, Internet Protocol (IP) packets. And increasingly, it is desirable to isolate traffic arriving at a WLAN AP for different SSIDs to different Virtual LANs (VLANs). For example, a single WLAN AP may be configured with a "CORPORATE" SSID and a "GUEST" SSID. To maintain network security, a system administrator may map the CORPORATE SSID to one VLAN, e.g., VLAN 100, and the GUEST SSID to a second VLAN, e.g., VLAN 900. Furthermore, when a VLAN spans network boundaries, a system administrator may desire to extend a VLAN across this boundary using a Virtual eXtensible LAN (VxLAN). This requires the creation of appropriate VxLAN tunnel endpoints.

It is desirable that the isolation (e.g., SSID to VLAN mapping) is consistent across a campus or multiple campuses. This provides benefits from a network management and security standpoint, and it also simplifies mobility aspects because wireless clients can roam from AP to AP without having to change IP address and without having to tear down real-time connections. In a scenario where a system administrator is deploying several WLAN APs connected to different network devices (e.g., edge switches), with each WLAN AP supporting a different number of SSIDs mapped to VLANs, several problems arise. First, spanning VLANs across the entire campus has practical challenges in terms of manageability, scalability and reliability. These approaches currently require significant manual configuration of each switch that supports each WLAN AP to ensure the port of the switch is correctly configured for each VLAN. Second, network layer boundaries between different parts of a wide area network (WAN) create barriers to spanning VLANs. Spanning VLANs is exacerbated by controller-less architectures that perform local bridging of traffic at the edge. This makes it difficult to ensure that the same SSID traffic maps to the same VLAN everywhere in the campus because the VLANs need to be spanned across a swatch of switches to create the required VLAN at every location where an AP needs to be deployed.

Thus, a solution over conventional systems for isolating network traffic and provisioning network isolation endpoints (e.g., VLANs and VxLAN) without requiring manual configuration at each port where it is needed is desirable. The disclosure herein achieves benefits over conventional system by creating a method for automatically provisioning network isolation at a network device in response to intra-device network access messaging without having to receive commands from users (e.g., system administrators). This solution, detailed in embodiments below, improves the efficiency of provisioning network isolation at a network device by allowing network devices to dynamically isolate network traffic (e.g., create VLANs, initialize VLANs, create VxLAN endpoints, etc.). Furthermore, the removal of need for manual action for the isolation reduces the possibility of configuration errors that might prevent the devices from properly provisioning the network isolation.

Systems and methods for providing network isolation are described herein for automatically provisioning the isolation of network traffic in response to device messaging protocols, for example, using link layer discovery protocol (LLDP) messaging. A network device is implemented to receive a network access message at a port of the network device and then determine isolation parameters (e.g., a VLAN identifier or VxLAN Network Identifier (VNI)) based on, for example, network access parameters contained in the network access message. Using the isolation parameter, the network device determines whether the port on which the network access message was received is configured with the isolation parameter (e.g., whether the port is configured to support VTEP for a specific VLAN). If the network device determines that network isolation associated with the determined identifier has not been configured on the port of the network device, the network device automatically configures, without receiving a configuration command from a user, network isolation using the isolation parameter.

Consider the example of configuring a WLAN AP to map a CORPORATE SSID to VLAN 100 and subsequently join the port to VNI 1000 by opening a VTEP. Under conventional systems, a system administrator must—upon plugging the WLAN AP into a port of a network device (e.g., a network switch)—configure the corresponding port to join VLAN 100 to VNI 1000 by joining a VTEP on that port. In other words, the system administrator must configure the port of the network device to isolate the CORPORATE SSID traffic on VLAN 100, e.g., tag CORPORATE SSID traffic with VLAN 100 and VNI 1000. The embodiments described herein, however, provide a plug and play experience that automates the configuration of the network port and more particularly automates the isolation of traffic on the network port. The configuration on a network device's switch port is automated via device messaging (e.g., WLAN AP to switch messaging). A device (e.g., the WLAN AP) signals a switch port to create the required isolation (e.g., VLAN tagging, VxLAN tunnel creation, or other isolation techniques). This can be done via proprietary messaging, or, for interoperability purposes between different vendors, via extensions to standard protocols such as LLDP. Upon receiving a message at the switch, a VNI number can be determined, for example, based on a relationship between network access parameters and isolation parameters (e.g., a table mapping a VLAN Id to a VNI) to use when automatically configuring the switch port. In some embodiments, the isolation (e.g., creation of a VTEP, or other isolation technique) may occur within the WLAN AP rather than at a corresponding port of a switch.

In some embodiments, configuration details and/or isolation parameters and messaging are pushed from a switch management console to the corresponding network devices.

Other aspects will be apparent from the following description and the claims.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Specific embodiments will now be described in detail with reference to the accompanying figures. In the following detailed description of these embodiments, numerous specific details are set forth in order to provide a more thorough understanding of the invention. However, it will be apparent to one of ordinary skill in the art and having the benefit of this disclosure that embodiments may be practiced without these specific details. In other instances, well-known features have not been described in detail to avoid unnecessarily complicating the description.

In the following description of FIGS. 1-9, any component described with regard to a figure, in various embodiments, may be equivalent to one or more like-named components described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments, any description of the components of a figure is to be interpreted as an optional embodiment which may be implemented in addition to, in conjunction with, or in place of the embodiments described with regard to a corresponding like-named component in any other figure.

In general, the following embodiments relate to configuring ports of a network device with isolation information determined based on network access parameters received in network access messages from other network devices. In general, embodiments relate to configuring a port on a network device in a computer network employing Virtual Local Area Network (VLAN) and Virtual eXtensible Local Area Network (VxLAN) frameworks. One version of the VxLAN protocol is defined in the document entitled "RFC 7348, VXLAN: A Framework for Overlaying Virtualized Layer 2 Networks over Layer 3 Networks," RFC 7348, dated August 2014. RFC 7348 is hereby incorporated by reference in its entirety. More specifically, embodiments allow for network device network messaging (e.g., LLDP messages) that contains network access parameters, which indicate properties of network connections (e.g., VLAN Id, SSID, physical port, IP address, device type, traffic class, protocol type), and using those network access parameters to determine corresponding isolation parameters (e.g., VLAN Id or VNI). The port of the network device that received the network access message can then be automatically configured with the appropriate isolation parameter based on the network access parameters without an administrator specifically configuring the port either locally or remotely. For example, the port can be configured to participate in a VLAN or a VxLAN (e.g., receive and transmit traffic meant for a specific VLAN Id and/or receive and transmit traffic meant for a specific VNI).

Figure 1:
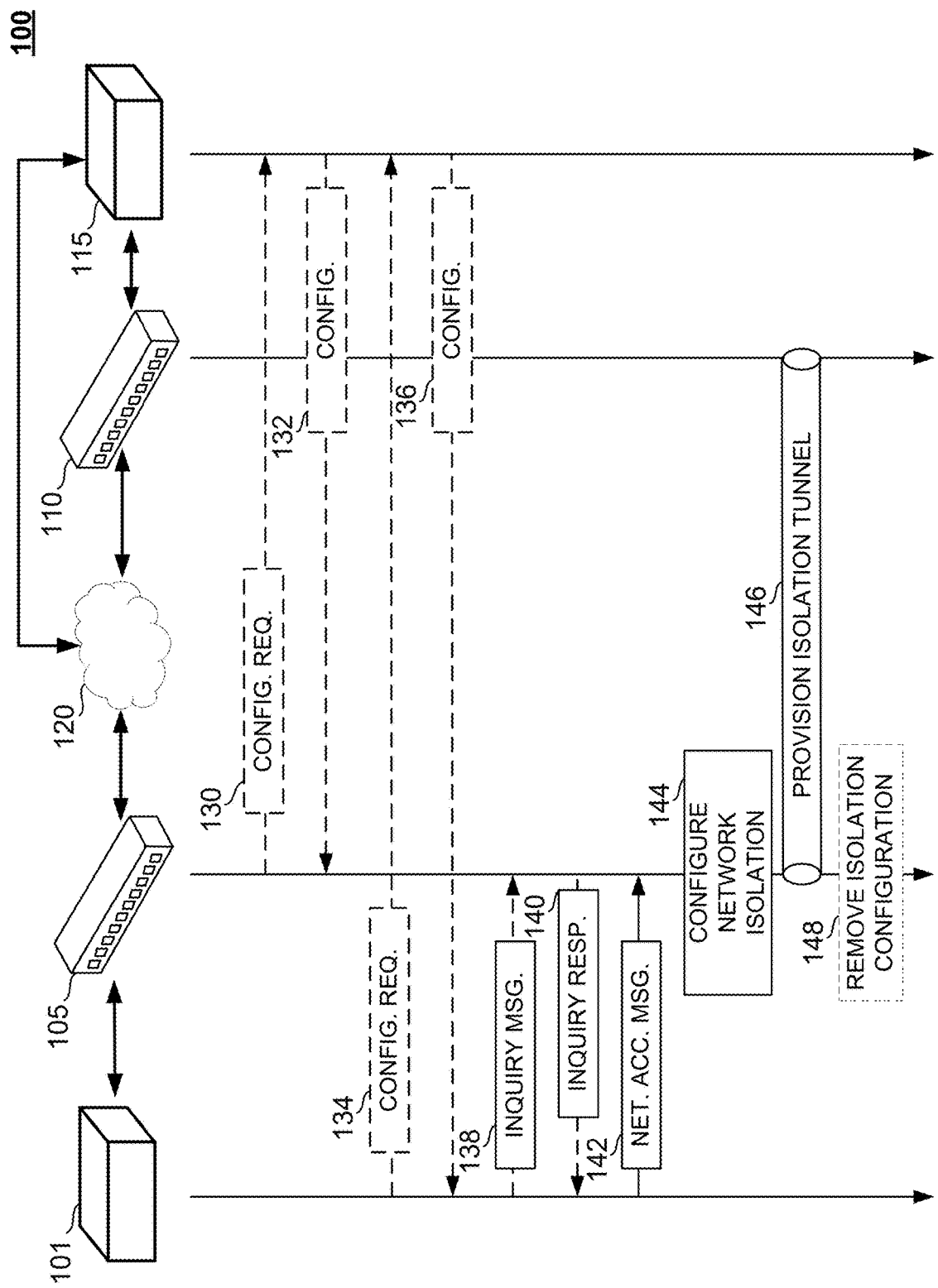
FIG. 1 illustrates one example of the messaging between network devices resulting in the automatic configuration of network isolation based on network access parameters, in accordance with some embodiments of the disclosure.

FIG. 1 shows a network topology 100 in accordance with one or more embodiments of the invention. The network topology 100 includes a network access device (NAD) 101 (e.g., a wireless access point (WAP), network access client, personal computer, mobile client, Internet-of-Things client, etc.) operatively connected to a port in a network device 105 (e.g., a switch). The network device 105 is connected to a network 120. Other devices in the network topology 100 include a second network device 110 (e.g., a switch) and a configuration server 115. FIG. 1 also shows a series of communications between devices and indicates operations that occur responsive to those communications.

In some embodiments, the network device 105 transmits a configuration request 130 to the configuration server 115. In some embodiments, the configuration request 130 may comprise any device information (e.g., device identifier, device type) that is used by the configuration server to identify the relevant configurations. In some embodiments, the configuration request 130 is device agnostic, and it is up to the network device 105 to identify the configuration information received from the configuration server 115 that applies to the device. Some embodiments for providing network devices with configuration data are discussed in greater detail in connection with Gourlay et al., U.S. Pat. No. 9,225,595, issued Dec. 29, 2017, which is hereby incorporated by reference herein in its entirety. The configuration server 115 retrieves configuration information from, for example, a local storage device and transmits the configuration 132 back to the network device 105. In some embodiments, the NAD 101 may be in communication with the configuration server 115 and the NAD 101 transmits a similar configuration request 134 to the configuration server 115. In similar fashion, the configuration server 115 retrieves configuration information for the NAD 101 and transmits the configuration 136 to the NAD 101.

In some embodiments, the NAD 101 is configured to inquire whether a connected network device is able to process network connectivity messages. If so configured, the NAD 101 may transmit an inquiry message 138 to network device 105. For example, the NAD 101 may transmit a message to the network device 105 to retrieve descriptors of protocols, application, or capabilities supported by the network device 105. The inquiry message 138 may request the network device 105 to generally identify its capabilities or to specifically identify whether it can process network access messages formatted with network access parameters. For example, the devices identify themselves and identify the allowable communication methods such as LLDP or specific port values supported by the devices. The network device 105 may transmit an inquiry response 140 that indicates whether it can process those messages. In some embodiments, the network device 105 may consider the inquiry message 138 to be an invalid message and not respond at all, in which case the NAD 101 may infer that network device 105 cannot process network access messages formatted with network access parameters.

The NAD 101 transmits a connectivity message 142, e.g., network access message, to the network device 105. A well-formed 802.1q data packet may be sent from the NAD 101 to the network device 105 that includes, for example, a VLAN tag (also known as a VLAN Id). In some embodiments, the network device 105 can extract network access parameters, e.g., the VLAN Id. In another example, the NAD 101 may transmit an LLDP formatted message to the network device 105. The network access message 142 may comprise one or more network access parameters associated with network connectivity and/or network access being provided by the NAD (e.g., when the NAD is providing wireless network access). For example, the NAD 101 may be configured to provide network access using a plurality of SSIDs, e.g., "CORPORATE", "GUEST", and "IOT", and the NAD 101 may contain a mapping of SSIDs to VLAN Ids. In this example, the network access message 142 may, therefore, be an LLDP message containing a VLAN Id. In another example, the NAD 101 may not contain a mapping of SSIDs to VLAN Ids, and instead the network access message 142 may, therefore, be an LLDP message including a custom type-length-value field that comprises a list of SSIDs as network access parameters to indicate to the network device 105 that the NAD 101 will be providing network access via those SSIDs. In some embodiments, the NAD 101 communicates the network access message 142 shortly after connecting with the network device 105. In some embodiments, NAD 101 communicates the network access message 142 in response to a wireless client device accessing the NAD 101 using an SSID that was not being used by other clients, i.e., upon the first client using a specific SSID connecting such that the port of the network device 105 may need to be configured to account for a new traffic source. In another example, the NAD 101 may be a personal computing device that is accessing the network. In such an example, the network access parameters may include information such as device class, TCP signatures, DHCP fingerprint, MAC address, or other information. In yet another example, the NAD 101 may be a thermostat that communicates within a facilities network with a heating ventilation air-condition (HVAC) controller and the network access parameters may include several attributes used to develop a device fingerprint that probably identifies the NAD 101 as within a genus of devices that belong to facilities operations.

When the network device 105 receives the network access message 142, it may respond to the message by determining network isolation configuration that is needed based on the message and parameters contained therein. For example, the network device 105 may receive a network access message 142 on a port, e.g., identified as port B1. The network device 105 may extract network access parameters from the network access message 142. The network device 105 may then use those network access parameters to determine whether the port is configured with the isolation parameters. For example, the network device 105 may access a mapping between VLAN Id and VNI or between an SSID and a VLAN identifier. Carrying through the example above, the network device 105 may contain a mapping between the "CORPORATE" SSID and VLAN 100, the "GUEST" SSID and VLAN 900, and the "IOT" SSID and VLAN 4095. In another example, the network device 105 may contain a table mapping VLANs 100, 900, and 4095 to VNIs 1000, 9000, and 40950. The network device 105 may then determine whether port B1 is configured with the corresponding isolation parameter, e.g., is configured to carry, and/or tag/untag, traffic bound for VLANs 100, 900, and 4095 or otherwise join a VLAN or VxLAN. If the network device 105 determines that port B1 is so configured, no additional configuration may be necessary. If the network device 105 determines that port B1 is not configured with the proper isolation parameter, it can automatically respond by applying the necessary configuration information to port B1, e.g., at step 144 of FIG. 1. In some embodiments, configuring the isolation parameter on port B1 may comprise creating an isolation tunnel 146, e.g., provisioning a VTEP on the port and establishing communication with a remote VTEP to facilitate joining port B1 to a VxLAN.

In some embodiments, and as described further with reference to FIG. 7 below, the network device 105 configures ports with enforcement rules and policies when configuring the port with isolation information. For example, a network access message may contain network parameters that indicate several untrusted devices are connected to the network device 105 via a specific port. The network device 105 may, for example, retrieve a set of rules, filters, or access control lists (ACL) that define how traffic is processed from untrusted devices. In some embodiments, the port that received the network access message is configured with the enforcement information as the isolation information. In other embodiments, the enforcement policies are applied to the port in conjunction with other isolation information, e.g., VLAN and/or VxLAN configurations.

In some embodiments, network device 105 is further configured to remove isolation configuration at appropriate times. For example, the NAD 101 may send a second network access message to the network device 105 that indicates that its network connectivity has changed. For example, the NAD 101 may be reconfigured such that it no longer provides network access via the "IOT" SSID. Thus, the NAD 101 may inform the network device 105 of that fact. The network device 105 may determine that isolation information related to the "IOT" network parameter, e.g., VLAN 4095 and VxLAN 40950, is no longer necessary for port B1 and may remove corresponding configuration information, e.g., at step 144 in FIG. 1, and/or close isolation tunnels that may have been opened for a VxLAN associated with VLAN 4095 and VxLAN 40950. In some embodiments, the network device 105 may monitor traffic on port B1 and determine that, after some threshold amount time, no traffic has passed through port B1 related to some isolation information. In response, the network device 105 may remove the corresponding configuration to conserve resources and/or to remove stale or outdated configuration information. It is often desirable to remove stale configuration settings that may pose unintended consequences due to changes in network design, topology, and configuration.

Figure 2:
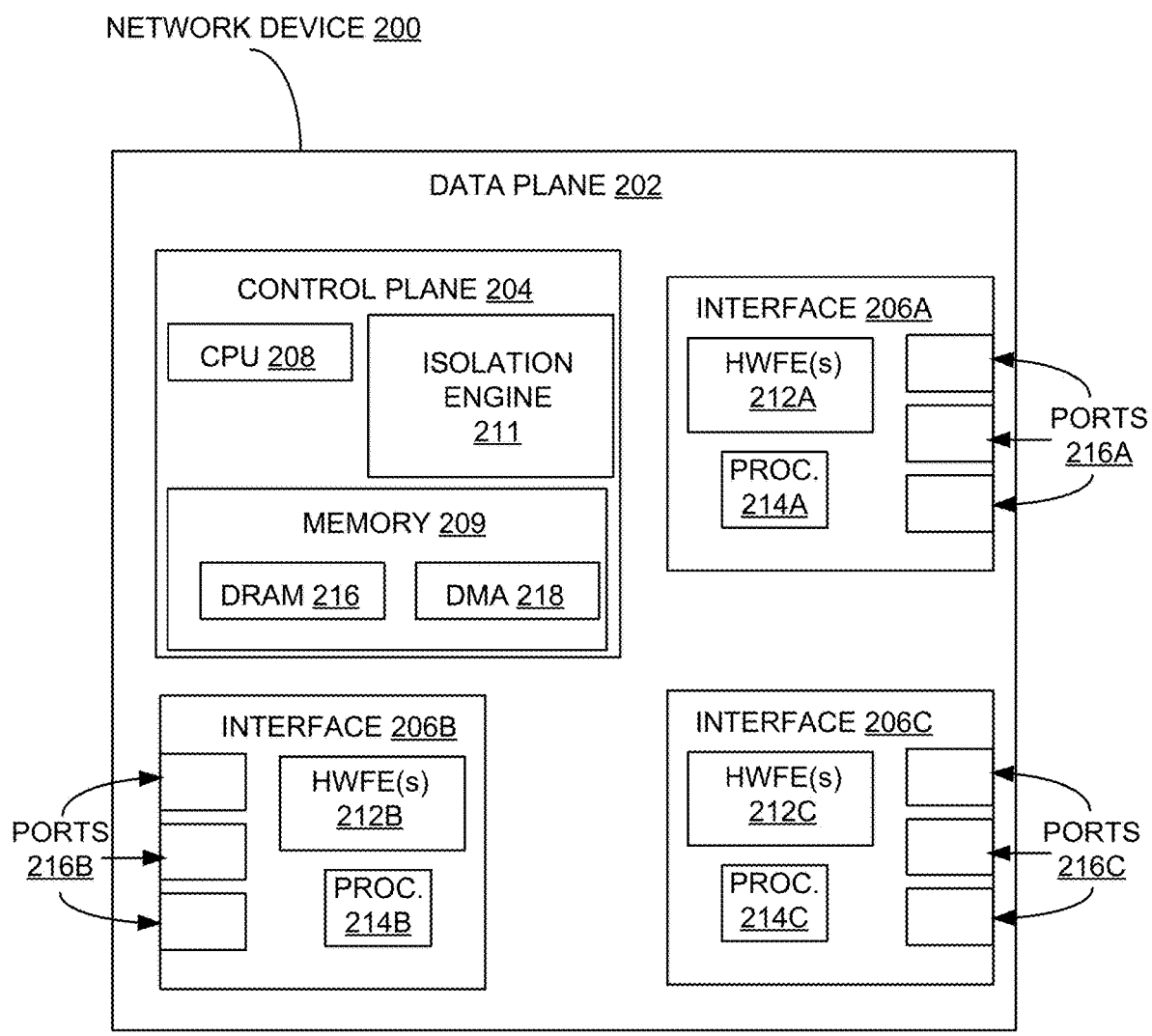
FIG. 2 illustrates one example of a network element that includes an exemplary isolation engine used when automatically configuring a network port with isolation information, in accordance with some embodiments of the disclosure.

FIG. 2 is a block diagram of a network device that includes an isolation engine for configuring network ports with isolation information in response to network access messages, in accordance with some embodiments of the disclosure. In FIG. 2, the network device 200 includes a data plane 202 and a control plane 204. In one embodiment, the data plane 202 receives, processes, and forwards network data using various configuration data (e.g., forwarding, security, quality of service (QoS), and other network traffic processing information). For example, for each received packet of the network traffic, the data plane determines a destination address of that packet, looks up the requisite information for that destination in one or more tables stored in the data plane, and forwards the packet out the proper outgoing interface.

The data plane 202 includes multiple interfaces, e.g., switches, 206A-C that can each receive, process, and/or forward network traffic. In one embodiment, the complex of one coprocessor and the associated forwarding engine(s) is one interface for the purposes of this invention. There may be multiple interfaces on a linecard, or just one. The interfaces may all be connected to the CPU using one PCI bus or multiple PCI buses, or some other shared bus used to access the DRAM in the interface. In this embodiment, the same design applies even if there are no linecards and even if there is a single coprocessor and forwarding engine. In a fixed system with no linecards, it is possible that there is still a coprocessor that does this. In another embodiment, the coprocessor associated with an interface may reside in the main CPU and be a separate thread of the same CPU or of another CPU in the system that is associated with one or more hardware forwarding engines. In a further embodiment, the coprocessor need not reside on the same linecard as the hardware forwarding engine. In this embodiment, the coprocessor has access to main memory (e.g., DMA controller) and the coprocessor has the ability to write to (and possibly read from) the associated hardware forwarding engines. The coprocessor can reside on a different linecard, or it could be dedicated coprocessor hardware on the main supervisor/controller card, or a thread of the main CPU. In another embodiment, the coprocessor may reside physically inside the hardware forwarding engine and be a component of that hardware forwarding engine.

In one embodiment, each interface 206A-C includes one or more hardware forwarding engines 212A-C, co-processor 214A-C, and ports 216A-C, respectively. In one embodiment, the hardware forwarding engines 212A-C is a component that forwards data for the network element (e.g., routing, switching, or another type of network forwarding). In one embodiment, the co-processor 214A-C is a processor for each interface 206A-C that can be used to accelerate various functions of the interface 206A-C. For example, and in one embodiment, the co-processors 214A-C can communicate with the isolation engine 211 in the control plane 204 to obtain isolation parameters and configure ports 216A-C. In one embodiment, there is one co-processor 214A-C for one or more hardware forwarding engines 212A-C. For example, and in one embodiment, there is one co-processor 214A for three hardware forwarding engines 212A. Operation of the interfaces 206A-C and isolation engine 211 is further described in FIGS. 3-8 below. In one embodiment, the ports 216A-C are used to receive and transmit network traffic. The ports 216A-C can be the same or different physical media (e.g., copper, optical, wireless and/or another physical media). In an alternative embodiment, one coprocessor can control multiple hardware forwarding engines (not illustrated). In a further embodiment, the hardware forwarding engines could be implemented in software or a combination of software and hardware. For example, and in one embodiment, the hardware forwarding engine could be doing the forwarding in software in some sort of programmable processor or network processor on the linecard, where the tables, memories, or data structures that are used by that forwarding engine are written to by the coprocessor.

In one embodiment, the interfaces 206A-C and control plane 204, either individually or collectively, comprise control circuitry. Control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate units, for example, multiple of the same type of processing units (e.g., two Intel Core i7 processors) or multiple different processors (e.g., an Intel Core i5 processor and an Intel Core i7 processor). In some embodiments, control circuitry executes instructions for an application stored in memory (e.g., storage). Specifically, control circuitry may be instructed by the application to perform the functions discussed above and below. In some implementations, any action performed by control circuitry may be based on instructions received from an application or from non-transitory computer readable medium (e.g., CD-ROM, DVD, hard disk).

In one embodiment, the control plane 204 gathers the configuration data for the hardware forwarding engines 212A-C from different sources (e.g., locally stored configuration data, via a command line interface, or other management channel (e.g., SNMP, Simple Object Access Protocol (SOAP), Representational State Transfer type Application Programming Interface (RESTful API), Hypertext Transfer Protocol (HTTP), HTTP over Secure Sockets layer (HTTPs), Network Configuration Protocol (NetConf), Secure Shell (SSH), and/or another management protocol) and pushes this configuration data to the hardware forwarding engines 212A-C and ports 216A-C via, in part, the isolation engine 211. In one embodiment, the control plane 204 includes central processing unit (CPU) 208 and DRAM 216, which is some cases is comprises all or part of control circuitry. In this embodiment, the CPU 208 is used to process information for the control plane 204. In particular, the CPU 208 writes configuration data for the hardware forwarding engines 212A-C and reads data from the hardware forwarding engines 212A-C.

In one embodiment, the DRAM 216 is memory that is used to stored data for the control plane. In addition, the DRAM 216 is shared with the data plane 202, because the co-processors 214A-C of the data plane 202 can access the contents of this memory. In one embodiment, the DRAM 216 includes isolation parameters used by the isolation engine 211 and/or isolation engine rules as describe with reference to FIG. 4 and a direct memory access (DMA) controller 218. Alternatively, the DMA controller 218 is not part of the DRAM 216, is part of the interfaces 106A-C, and is coupled to the DRAM 216.

Figure 3:
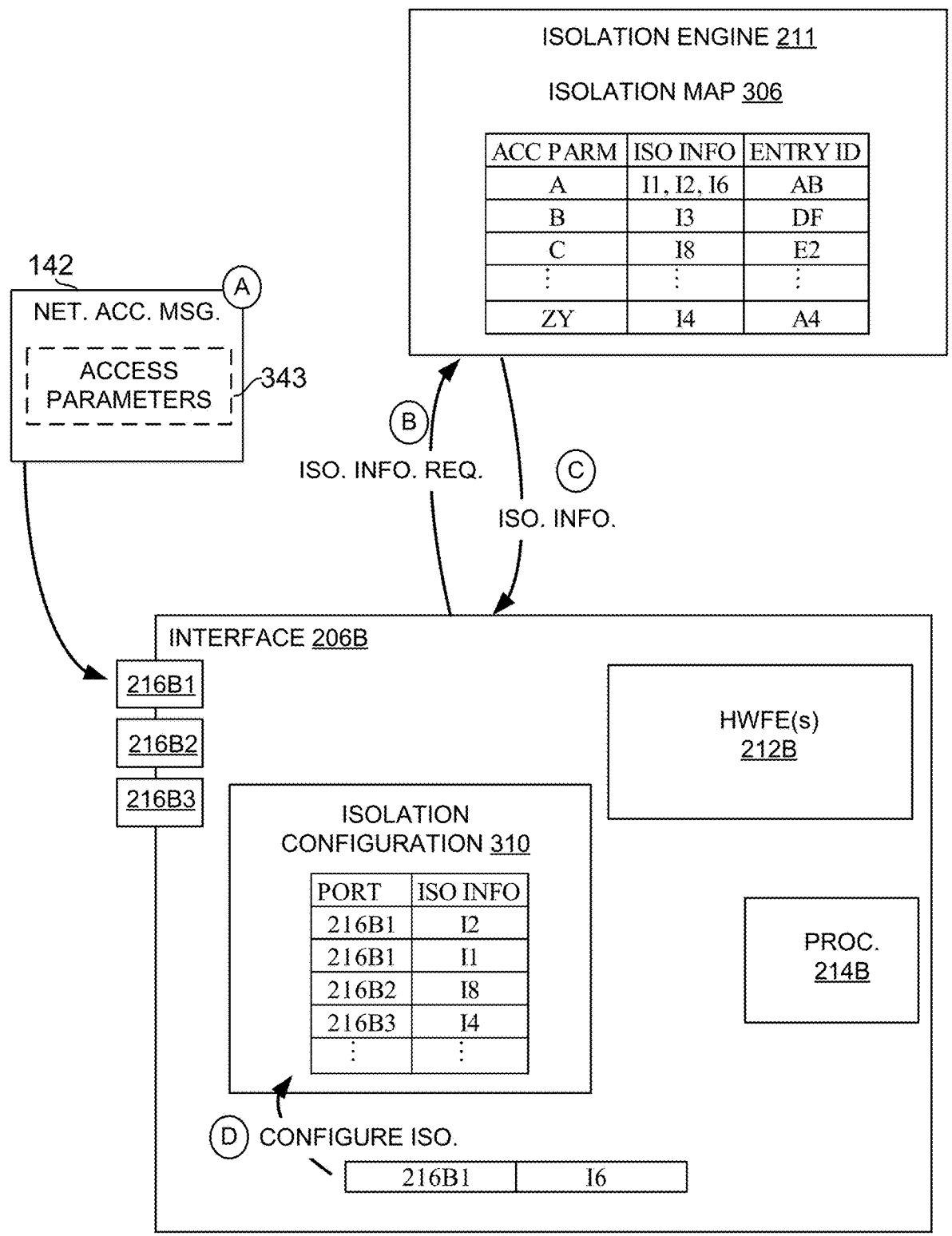
FIG. 3 illustrates operations that occur at an exemplary network element, using an isolation engine, to automatically configure a network port with isolation information, in accordance with some embodiments of the disclosure.

FIG. 3 illustrates operations that occur at an exemplary network element, using an isolation engine, to automatically configure a network port with isolation parameters, in accordance with some embodiments of the disclosure. FIG. 3 illustrates the isolation engine 211 of FIG. 2 and the interface 206B of FIG. 2. In FIG. 3, port B1 from ports 216B (i.e., port 216B1) of FIG. 2 receives a network access message 142, e.g., a message as described with reference to FIG. 1, at time point A. In some embodiments, the network access message comprises network access parameters 343 as described above. In some embodiments, the network access parameters may be derived from the network access message 142, e.g., by extracting data fields from headers and payloads of well-formed ethernet, e.g., 802.1q, messages. In response to receiving the network access message 142, the interface 206B interacts with the isolation engine 211 to obtain isolation parameters by, for example, requesting isolation parameters at time point B. In some embodiments, the processor 214B communicates with the control plane to request isolation parameters based on the network access message 142. For example, the interface 206B may format a request for isolation parameters and transmit that message to the control plane 204 for processing of the isolation parameters. In some embodiments, the request for isolation parameters is a copy of the network access message 142, while in other embodiments, the request for information comprises parameters for determining the isolation parameters without comprising the entirety of the network access message 142. It would be appreciated by one of skill in the art that in well-known technique for process communication or process messaging, e.g., shared memory or interprocess communication, may be employed for this communication.

The isolation engine 211 may employ several techniques, or combine several techniques, in response to a request for isolation parameters. For example, the isolation engine 211 may include an isolation map 306 which maps network access parameters to isolation parameters. Upon receiving a request for isolation parameters, the isolation engine 211 may extract one or more network access parameters and determine whether the isolation map 306 contains an entry mapping that parameter to isolation parameters. For example, the isolation map 306 may contain entries mapping VLAN 900 to VNI 9000 and VLAN 4095 to VNI 40950. In another example, the isolation map 306 may contain an entry mapping a "GUEST" SSID to VLAN 900 and VNI 9000. In this example, the isolation engine 211 would transmit, e.g., at timepoint C, isolation parameters identifying VLAN 900 and VNI 9000 in response to receiving a request for isolation parameters that identifies the VLAN 900. In some embodiments, isolation engine 211 may be configured to operate using a hierarchical, multi-level rules-based system described in further detail in FIG. 4. In such embodiments, the network access parameters in the request for isolation parameters may include several parameters to be used within the rules-based engine.

In response to receiving the isolation parameters from the isolation engine 211, the interface 206B determines whether the port that received the network access message is configured with the isolation parameters. For example, the interface 206B determines whether port 216B1 is configured for VLAN 900 and VNI 9000. In some embodiments, the interface 206B comprises isolation configuration 310 that maintains a listing of ports and isolation parameters that has been applied to each port. When the interface 206B receives isolation parameters for a port based on a network access message, it can look up those isolation parameters, by, for example, an identifier value for the isolation parameters and determine whether the port is already so configured. In FIG. 3, the isolation parameters associated with the network access parameters of network access message 142 are marked with identifier "I6" and, at timepoint D, interface 206B adds this configuration to the isolation configuration 310 for port 216B1. In some embodiments, and depending on the isolation parameters, the application of the configuration to port 216B1 may also include establishing an isolation tunnel, for example opening communication with one or more VTEPS to join the port to a VxLAN.

Figure 4:
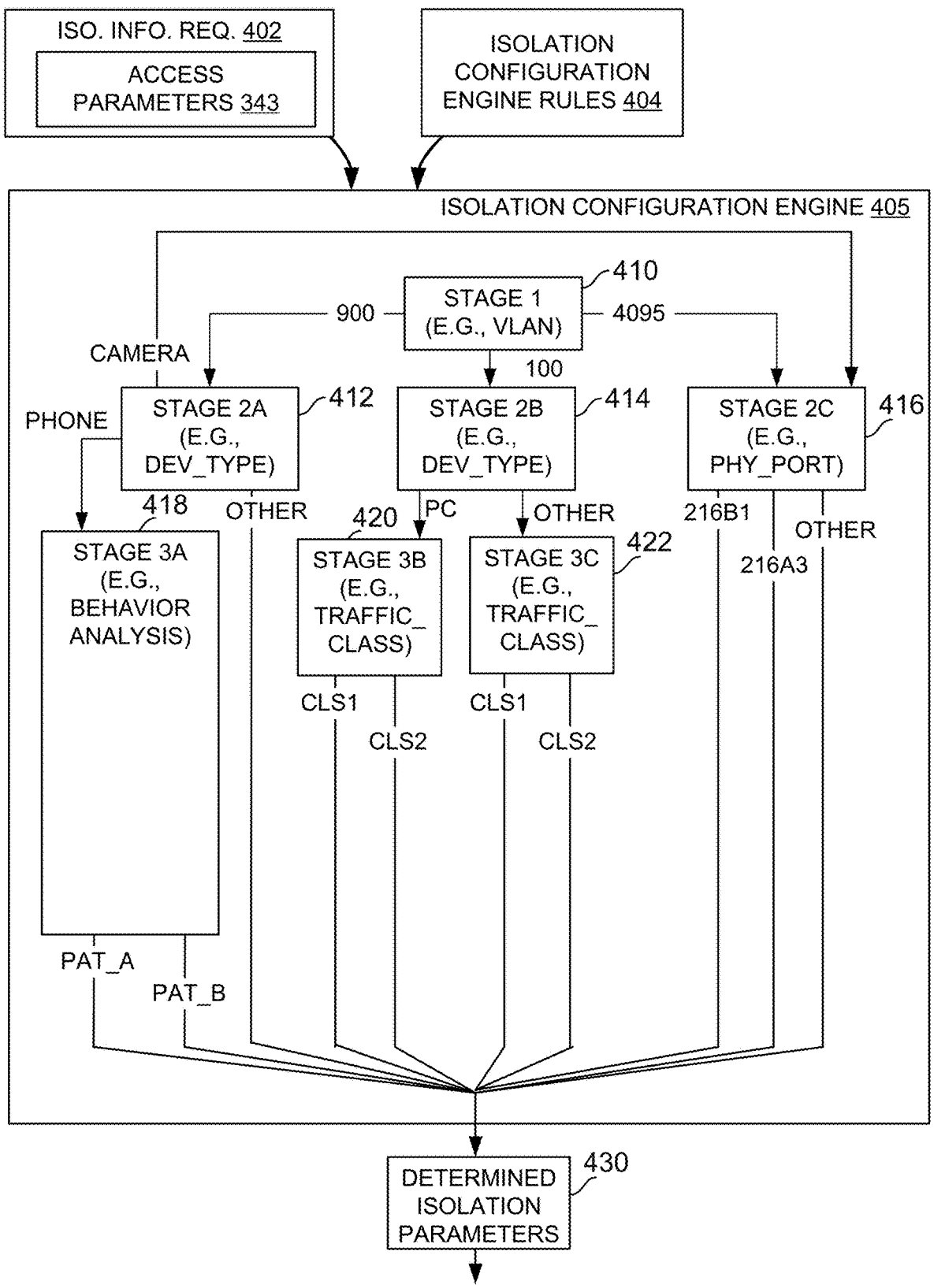
FIG. 4 illustrates an exemplary isolation configuration engine configured to implement a hierarchy of rules for determining an isolation parameter from a plurality of network parameters, in accordance with some embodiments of the disclosure.

FIG. 4 illustrates an exemplary isolation configuration engine configured to implement a hierarchy of rules for determining isolation parameters from a plurality of network parameters, in accordance with some embodiments of the disclosure. The isolation configuration engine 405 is configured to receive a set of isolation configuration engine rules 404. The rules may be provided to the isolation configuration engine as a structured data file, e.g., an XML file, that defines chains of rules that describe a comparison of network access parameters with test values and an outcome of the rules. The rules, in some embodiments, represent, or are implemented by, one or more Boolean equation of parameters that select the proper isolation parameters.

For example, the rules may start with a first stage test that determines whether a VLAN Id in the network access parameters is 100, 900, or 4095. If the VLAN Id parameter is 100, then the rules may be defined to transition the engine to a second rule 414, if the VLAN Id parameter is 900, then a transition to a third rule 412 is defined, and if the VLAN Id parameter is 4095, then a transition is defined to yet a fourth rule 416. Any rule may result in the end of the rule chain and define corresponding isolation parameters. In some embodiments, the isolation configuration engine may provide API functions and/or allow device administrators to programmatically (e.g., in source code or compiled object code) define the isolation configuration option. In some embodiments, the isolation configuration engine rules 404 are provided by a user to a system via graphical user interface that provides a menu which allows a user to draw a graph representation of the rules and chain of rules.

In FIG. 4, the exemplary rule structure, as defined by the isolation configuration engine rules 404, is comprised of seven rules: 410, 412, 414, 416, 418, 420, and 422. The first rule 410 is a determination of which VLAN is in the access parameters 343 of isolation parameters request 402. The rules engine defines three possible outcomes that each point to another rule: VLAN Id 900 moves the engine to rule 412, VLAN Id 100 moves the engine to rule 414, and VLAN Id 4095 moves the engine to rule 416. Rule 412 determines the device type parameter in the access parameters 343: "CAMERA" moves the engine to rule 416, "PHONE" moves the engine to rule 418, and any other device type leads to the selection of a particular set of isolation parameters. Rule 414 also defines a rule using device type. For rule 414, a device type parameter of "PC" moves the engine to rule 420 while any other device type moves the engine to rule 422. Rule 416 determines the physical port parameter in the access parameters 343. A physical port parameter of 216B1 leads to the selection of one set of isolation parameters, a parameter of 216A3 leads to the selection of a second set of isolation parameters, while all other physical port parameters lead to the selection of a third set of isolation parameters.

Rule 418 shows another type of rule in FIG. 4. Rule 418 is a behavior analysis rule. For example, network device 105 may implement machine learning algorithms based, for example, on an end user device's monitored interactions with other devices. The network device 105 may determine, for example, that the network access parameters include an identifier of an end user device. The isolation configuration engine may then retrieve a log of monitored interactions that match one of several patterns, e.g., pattern A or pattern B. For example, the monitored interactions may indicate that an unknown end user device is consistently communicating with a number of IP addresses flagged as suspicious. Thus, the isolation configuration engine 405 may consider the end user device to be suspicious and determine isolation parameters corresponding to the suspicious interactions.

Rules 420 and 422 are both defined to test a traffic class parameter from the access parameters 343. Each rule defines two potential isolation parameters outcomes, though not necessarily the same two isolation parameters, or in the same order, as that would make rule 414 largely unneeded. In each exemplary rule, a traffic class parameter of "CLASS 1" results in a first isolation parameters for that rule and a traffic class parameter of "CLASS 2" results in a second isolation parameters for that rule.

When the isolation configuration engine 405 completes a chain of rules, the isolation configuration engine will have arrived at a determined isolation parameters 430 corresponding to the access parameters 343. This isolation parameter is returned to a requestor, e.g., interface 206B of FIGS. 2 and 3.

Another exemplar rule is a rule for different network device fingerprints. For example, a device fingerprint is a collection of information about a remote computing device for the purpose of identification. The collection of information may include, for example, MAC address, DHCP class ID, SNMP attributes, User-Agent, TCP signatures, names of fonts used on the device for display. In some embodiments, the rule may refer to a third-party service that collects a database of parameters to generate a fingerprint for devices. The rule may then be used to allow specific devices or genus of devices to a specific chain of rules. For example, rather than performing behavior analysis in rule 418, a rule based on network device fingerprint could be implemented that allows the a rule chain to have two paths for devices that fit within (1) a genus of mobile devices based and (2) a genus of non-mobile devices.

One of skill in the art would appreciate that the rules and specific chaining of rules in FIG. 4 are exemplary. The configurable nature of the rules engine allows for an unenumerable combination of rules. Moreover, while the description herein references some potential network access parameters (e.g., VLAN Id, SSID, device type, physical port) it would be apparent that any appropriate parameter could be used instead of those parameters listed. The embodiments herein are not limited to the specific parameters listed or the values tested against.

Figure 5:
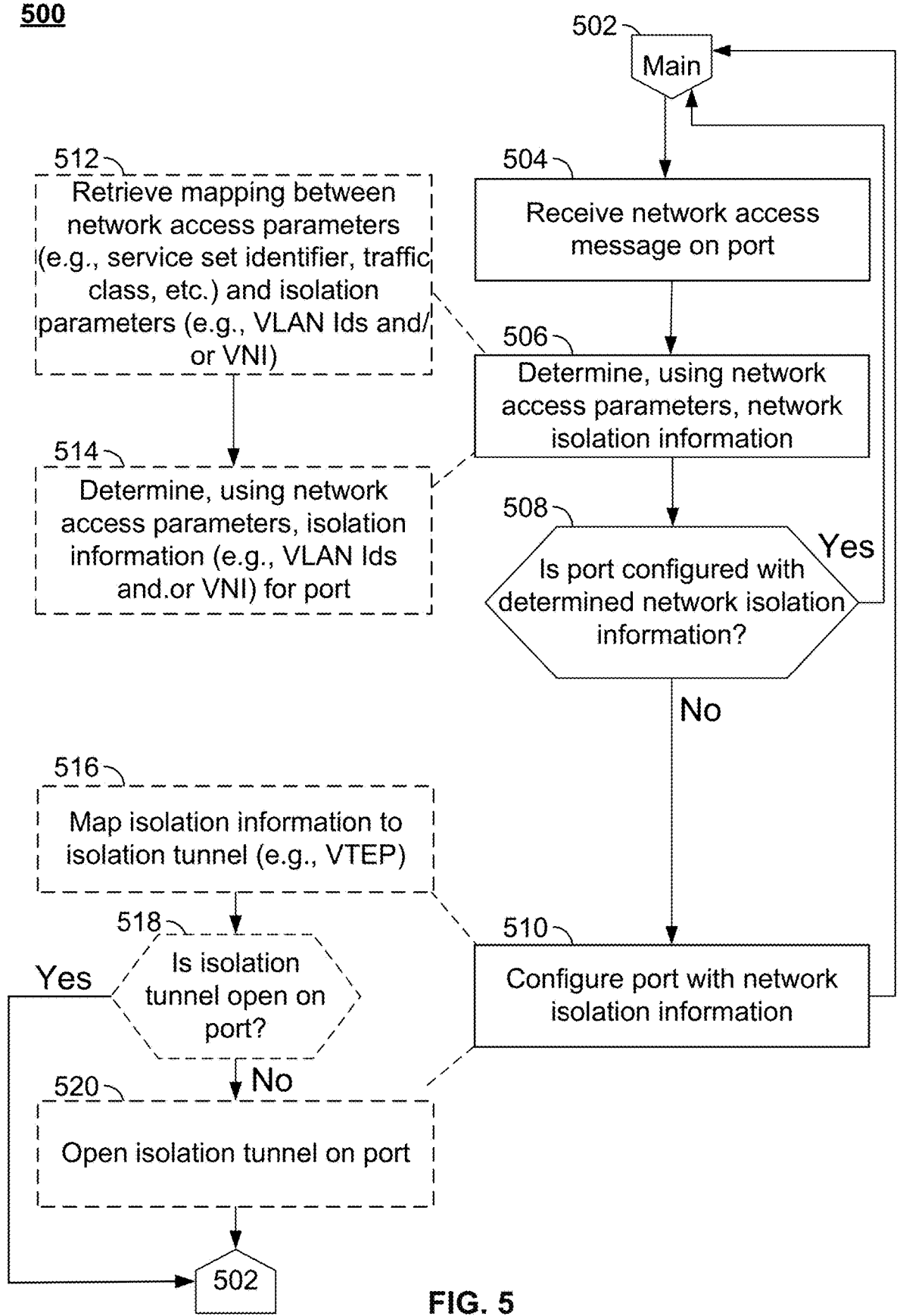
FIG. 5 is a flowchart of a detailed illustrative process for automatically configuring a network port with isolation information based on network access parameters received in a network access message, in accordance with some embodiments of the disclosure.

FIG. 5 is a flowchart of a detailed illustrative process for automatically configuring a network port with isolation parameters based on network access parameters received in a network access message, in accordance with some embodiments of the disclosure. A main loop of process 500 begins at step 502. At step 504, control circuitry in a network device receives a network access message from a port of the network device. For example, the control circuitry receives a network access message from a second network device that is connected to the network device on a specific port. As noted above, the network access message comprises network access parameters to be used when the second network device provides network access to a plurality of network access devices, e.g., a VLAN Id or properties of the plurality of network access devices such as device type, device ID, or fingerprint. In some embodiments, the second network device determines specific parameters to include in the network access message. In some embodiments, the network access parameters are derived by the network device from the message.

Process 500 continues at step 506 where the control circuitry determines, using the network access parameters network isolation parameters to use for traffic originating on a port, e.g., traffic from the plurality of network access devices. In some embodiments, the control circuitry accomplishes step 506 using steps 512 and 514 by mapping parameters to isolation parameters. For example, if the network access parameters comprise service set identifiers, then the control circuitry may, at step 512, retrieve mappings between a plurality of VLAN identifiers and a plurality of VNIs and, at step 514, determine which VNI to use as isolation parameters. In some embodiments, the mappings between network access parameters and isolation parameters are retrieved from a remote data source, e.g., from configuration server 115 of FIG. 1. In some embodiments, the mappings are retrieved from a local data store.

At step 508, process 500 continues where the control circuitry determines whether the port of the first network device is configured with the network isolation parameters (e.g., whether the port is configured with the VNI identifier determined in step 514). If the port is already configured, then process 500 continues at step 502. If, however, the port is not configured with the determined isolation parameters, then the process continues at step 510.

At step 510, the control circuitry, in response to determining that the port of the first network device is not configured with the network isolation parameters, automatically configures the port of the first network device with the network isolation parameters. In some embodiments, configuring the port of the first network device with the network isolation parameters includes configuring a port with VLAN information. In some embodiments, configuring the port of the first network device with the network isolation parameters also includes joining VxLAN on the port. In such embodiments, process 500 may continue to step 516 where the control circuitry maps the isolation parameters to isolation tunnel information. For example, the control circuitry may determine a VNI based on the network isolation parameters (e.g., from a VLAN identifier). The control circuitry may then, at step 518, determine whether a VTEP is open on the port device, and opens, at step 520, a VTEP on the port of the network device if one is not already opened. Thus, a VxLAN tunnel may be provisioned on the port of the network device using the VNI. After step 510, process 500 continues back at step 502 at awaits a network access message.

Figure 6:
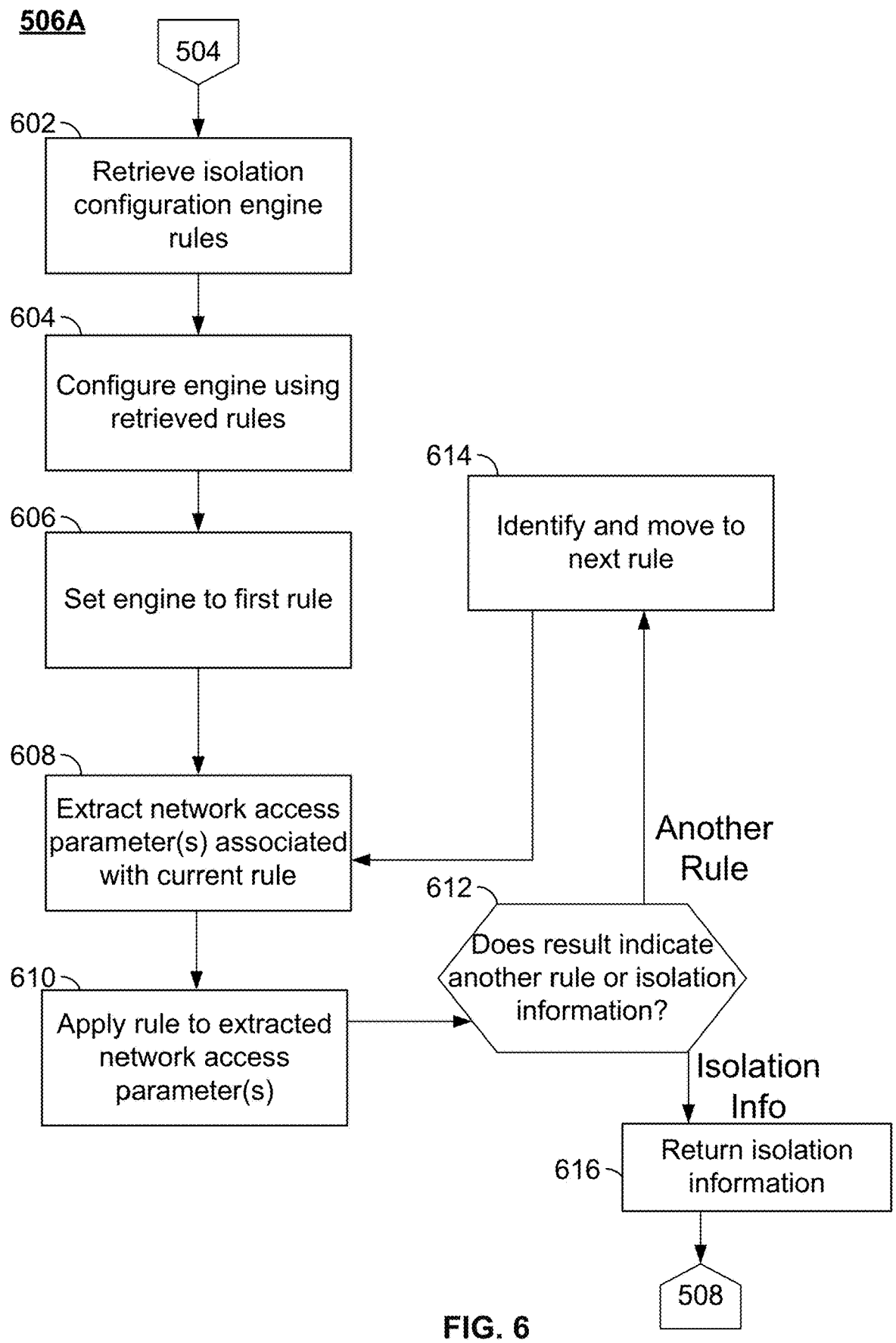
FIG. 6 is a flowchart of a detailed illustrative process for determining isolation information in a rules-based isolation configuration engine, in accordance with some embodiments of the disclosure.

FIG. 6 is a flowchart of a detailed illustrative process for determining isolation parameters in a rules-based isolation configuration engine, in accordance with some embodiments of the disclosure. Process 506A is an exemplary embodiment for determining the network isolation parameters such as performed by step 506 in process 500 of FIG. 5 using a hierarchical rules engine.

At step 602, control circuitry retrieves isolation configuration engine rules. In some embodiments, the control circuitry may contact a remote server, e.g., configuration server 115, to obtain the isolation configuration engine rules. In some embodiments, the control circuitry may retrieve the rules from local storage or memory. At step 604, the control circuitry configures the isolation configuration engine using the retrieved rules. Using the example of FIG. 4, the control circuitry configures the rules engine to have seven rules: 410, 412, 414, 416, 418, 420, and 422. At step 606, the control circuitry sets the isolation configuration engine to the first rule in the configuration (e.g., rule 410 of FIG. 4). Process 506A continues at step 608 where the control circuitry extracts one or more network access parameters received in association with the network access message. The control circuitry extracts network access parameters defined for use by the current rule, i.e., at this point the first rule in the isolation configuration engine rules.

The control circuitry applies the current rule to the extracted network access parameters and follows the result of the rule to the either another rule as defined in the configuration or to isolation parameters. For example, if the current rule tests an VLAN Id parameter in the network access parameters, then one VLAN Id may cause the isolation configuration engine to transition to a second rule while another VLAN Id may cause the isolation configuration engine to select isolation parameters to return. At step 612, the control circuitry determines whether the result of the current rule indicates another rule or isolation parameters for return. If the results indicate another rule in the chain, the control circuitry identifies the next rule and moves the isolation engine to the identified rule at step 614. The control circuitry continues process 506A at step 608. If, however, the result indicates isolation parameters, then the control circuitry returns the isolation parameters to the requestor at step 616.

Figure 7:
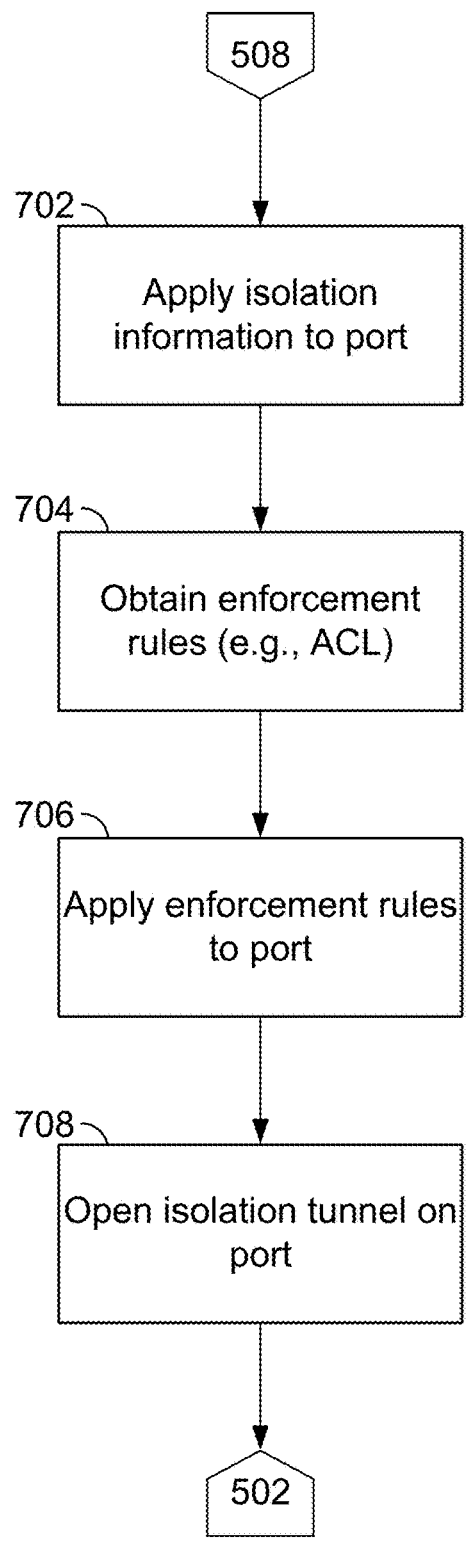
FIG. 7 is a flowchart of a detailed illustrative process for opening an isolation tunnel when configuring a port with isolation information, in accordance with some embodiments of the disclosure.

FIG. 7 is a flowchart of a detailed illustrative process for opening an isolation tunnel when configuring a port with isolation parameters, in accordance with some embodiments of the disclosure. Process 700 continues after, for example, step 508 of FIG. 5. At step 702, the control circuitry applies isolation parameters, for example as determined at step 506 of FIG. 5, to a port in a network device. At step 704, the control circuitry obtains enforcement rules (e.g., ACL information). In some embodiments, the enforcement rules may be obtained from a remote server or from local storage. At 706, the control circuitry applies the enforcement rules to the port of the network device. In some embodiments, the rules are applied to the port by configuring a firewall with traffic rules that filter incoming traffic according to the defined enforcement rules. In some embodiments, the control circuitry opens an isolation tunnel on the port at step 708.

Figure 8:
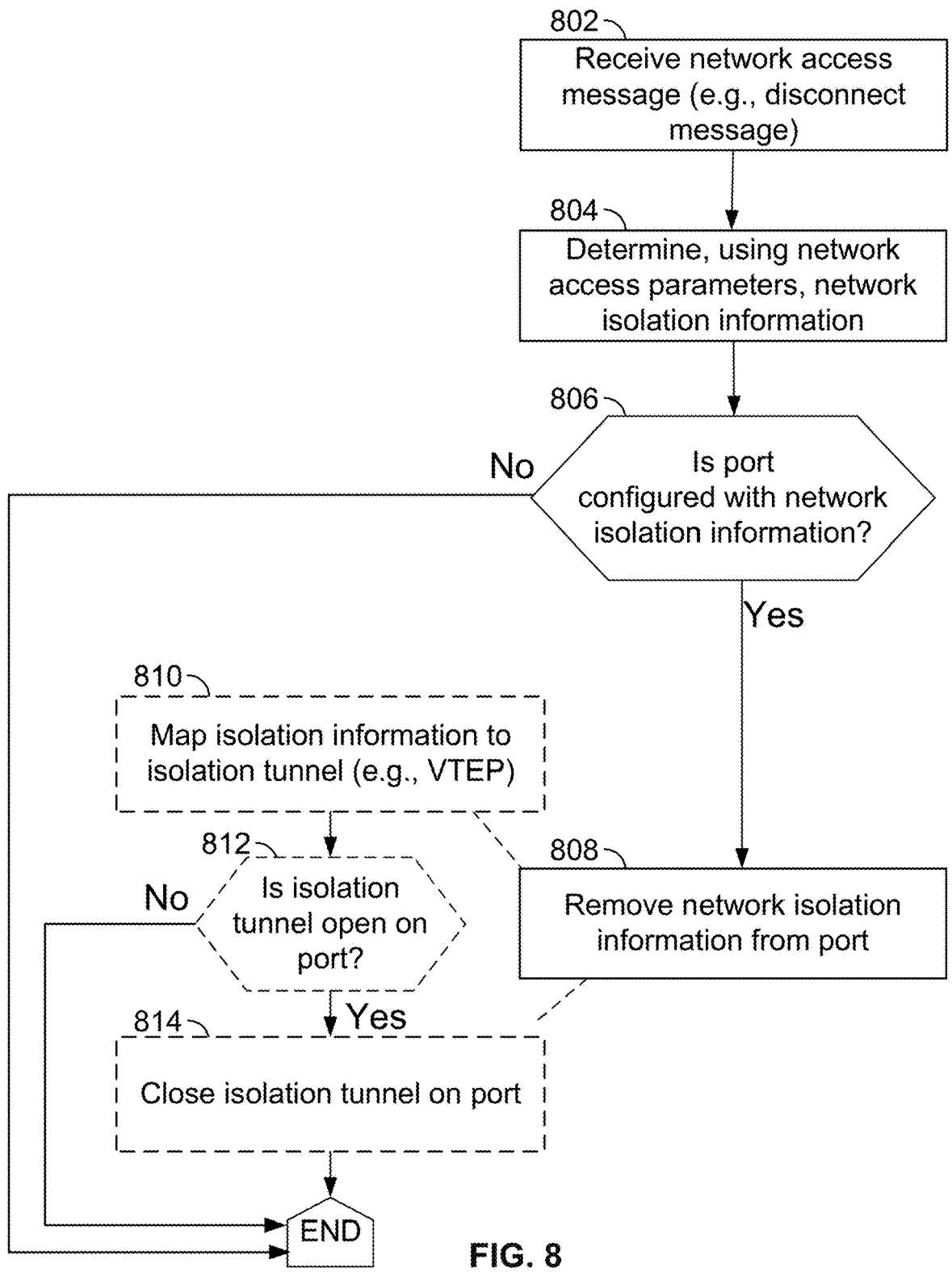
FIG. 8 is a flowchart of a detailed illustrative process for removing isolation information from a port in a network device in response to receiving a network access message, in accordance with some embodiments of the disclosure.

FIG. 8 is a flowchart of a detailed illustrative process for removing isolation parameters from a port in a network device in response to receiving a network access message, in accordance with some embodiments of the disclosure. At step 802, a network device, e.g., network device 105, receives a network access message such as a disconnect message. Similar to the manner described with reference to FIG. 5, the control circuitry, at step 804, determines network isolation parameters associated with the network access message based on network access parameters in the message. The control circuitry determines, at step 806, whether the port is configured with the isolation parameters and, if not, the process 800 concludes.

If the port is configured with the isolation parameters then the control circuitry continues at step 808 and removes the network isolation parameters from the port. In some embodiments, the removal of the isolation parameters from the port occurs by tearing down an isolation tunnel (e.g., closing an VTEP) on the port. For example, at step 810, the control circuitry maps isolation parameters to an isolation tunnel (e.g., a VTEP with a specific VNI). The control circuitry determines, at step 812, whether the isolation tunnel is open on the port. If the isolation tunnel is open on the port, then the process 800 continues at step 814 by closing the isolation tunnel.

Figure 9:
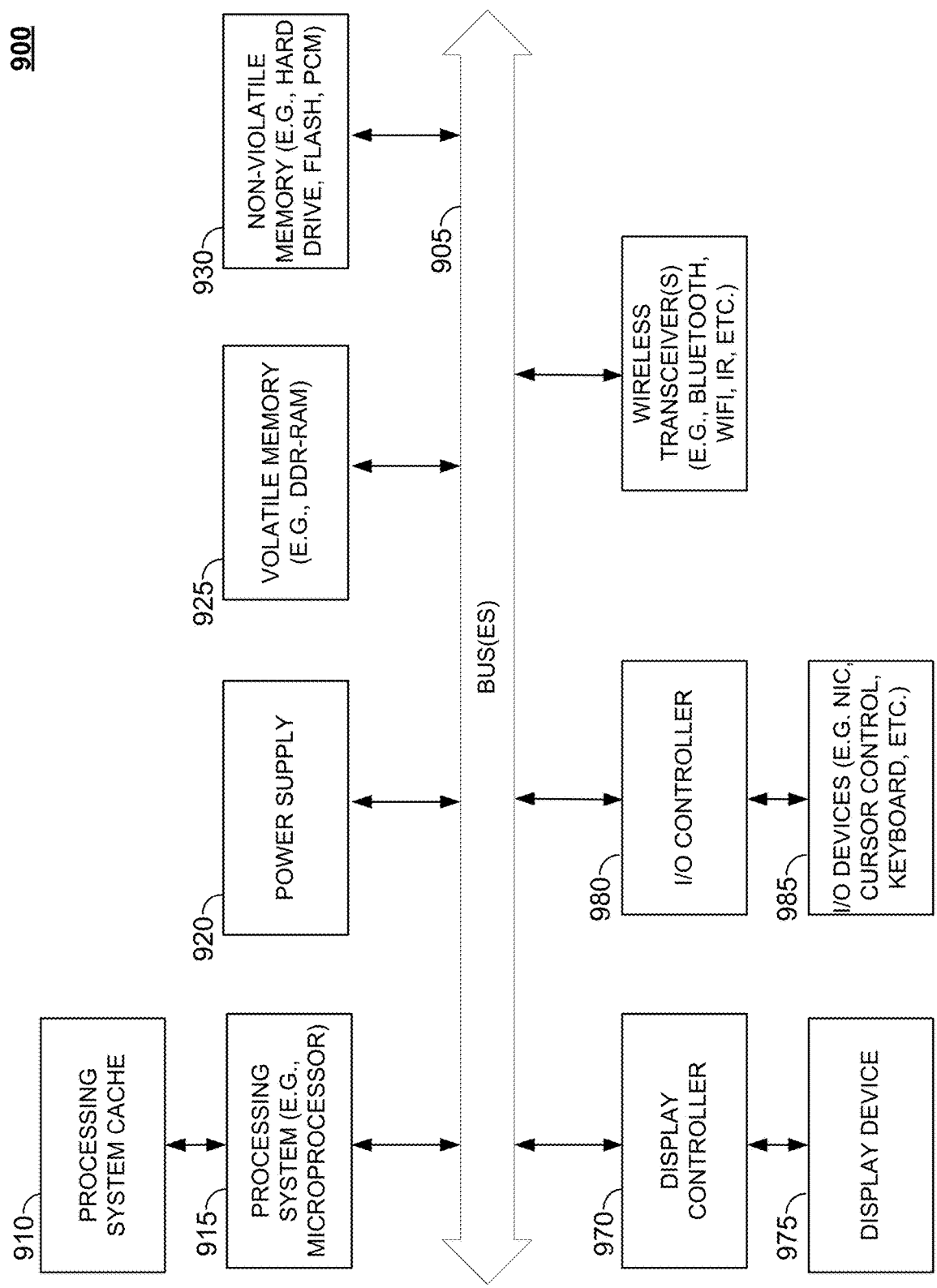
FIG. 9 illustrates one example of a typical computer system, which may be used in conjunction with the embodiments described herein.

FIG. 9 shows one example of a data processing system 900, which may be used with one embodiment of the present invention. For example, the system 900 may be use as a network element shown in FIG. 1. Note that while FIG. 9 illustrates various components of a computer system, it is not intended to represent any particular architecture or manner of interconnecting the components, as such details are not germane to the present invention.

As shown in FIG. 9, the computer system 900, which is a form of a data processing system, includes a bus 905 which is coupled to a power supply 920, processing system (e.g., microprocessor(s)) 915, a processing system cache 910, volatile RAM 925 and a non-volatile memory 930. The microprocessor 915, which in some embodiments makes up the control circuitry, may retrieve the instructions from the memories 910, 925, 930 and execute the instructions to perform operations described above. The bus 905 interconnects these various components and also interconnects these components 915, 910, 925, and 930 to a display controller 970, display device 975, an I/O controller 980 and peripheral devices (985) such as input/output (I/O) devices which may be mice, keyboards, modems, network interfaces, printers and other devices which are well known in the art. In one embodiment, the system 900 includes a plurality of network interfaces of the same or different types (e.g., Ethernet copper interface, Ethernet fiber interfaces, wireless, and/or other types of network interfaces). In this embodiment, the system 900 can include a forwarding engine to forward network data received on one interface out through another interface.

Typically, the input/output devices 985 are coupled to the system through input/output controllers 980. The volatile RAM (Random Access Memory) 925 is typically implemented as dynamic RAM (DRAM), which requires power continually in order to refresh or maintain the data in the memory.

The mass storage 930 is typically a magnetic hard drive or a magnetic optical drive, an optical drive, a DVD RAM, a flash memory, or other types of memory systems, which maintain data (e.g., large amounts of data) even after power is removed from the system. Typically, the mass storage 930 will also be a random access memory although this is not required. While FIG. 9 shows that the mass storage 930 is a local device coupled directly to the rest of the components in the system, it will be appreciated that the present invention may utilize a non-volatile memory which is remote from the system, such as a network storage device which is coupled to the data processing system through a network interface such as a modem, an Ethernet interface or a wireless network. The bus 905 may include one or more buses connected to each other through various bridges, controllers and/or adapters, as is well known in the art.

Portions of what was described above may be implemented with logic circuitry such as a dedicated logic circuit or with a microcontroller or other form of processing core that executes program code instructions. Thus, processes taught by the discussion above may be performed with program code, such as machine-executable instructions that cause a machine that executes these instructions to perform certain functions. In this context, a "machine" may be a machine that converts intermediate-form instructions into processor-specific instructions (e.g., an abstract execution environment such as a "process virtual machine" (e.g., a Java Virtual Machine), an interpreter, a Common Language Runtime, a high-level language virtual machine, etc.), and/or electronic circuitry disposed on a semiconductor chip (e.g., "logic circuitry" implemented with transistors) designed to execute instructions, such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer-readable storage medium, such as, but is not limited to, any type of disk, including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine-readable medium includes any mechanism for storing or transmitting information in a form readable by a machine (e.g., a computer). For example, a machine-readable medium includes read only memory ("ROM"), random access memory ("RAM"), magnetic disk storage media, optical storage media, flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present disclosure is not described with reference to any particular programming language. It will be appreciated that a variety of programming languages may be used to implement the teachings of the disclosure as described herein.

The foregoing discussion merely describes some exemplary embodiments. One skilled in the art will readily recognize from such discussion, the accompanying drawings and the claims that various modifications can be made without departing from the spirit and scope of the disclosure.

What is claimed is:

1. A method for automatically configuring a network port at a first network device with isolation parameters, the method comprising:
   receiving, at the network port of the first network device from a second network device, a network access message, wherein the network access message comprises network access parameters, including a first identifier, to be used when the second network device communicates with the first network device;
   retrieving, at the first network device, a mapping of the received first identifier to a second identifier;
   determining, at the first network device, a network isolation parameter based on the retrieved mapping, wherein the network isolation parameter is to be used for a plurality of network packets received at the first network device from the second network device;
   determining, at the first network device, whether the network port of the first network device is configured with the network isolation parameter;
   in response to determining that the network port of the first network device is not configured with the network isolation parameter, the first network device automatically configuring the network port of the first network device with the network isolation parameter to isolate traffic that does not contain the first identifier;
   subsequent to configuring the network port of the first network device with the network isolation parameter, receiving from the second network device a second network access message comprising a disconnect message; and
   in response to receiving the disconnect message, removing the configuration associated with the network isolation parameter from the network port.

2. The method of claim 1, wherein the network access parameters comprise one or more virtual local area network identifiers and wherein determining the network isolation parameter based on the retrieved mapping comprises performing a lookup of association between the one or more virtual local area network identifiers and one of more virtual extensible local area network identifiers.

3. The method of claim 2, further comprising retrieving, by the first network device from a management server, a data structure comprising a plurality of associations between virtual local area network identifiers and virtual extensible local area network identifiers.

4. The method of claim 1, wherein the network access parameters comprise traffic class information associated with a plurality of network access devices connected to the second network device and wherein determining the network isolation parameter based on the retrieved mapping comprises:
   retrieving a mapping between a plurality of traffic classes and a plurality of virtual local area network identifiers; and
   determining which virtual local area network identifiers from the plurality of virtual local area network identifiers are mapped to the one or more traffic classes.

5. The method of claim 1, further comprising determining the network isolation parameter based on the network access parameters comprising:
   retrieving a set of rules for mapping a plurality of the network access parameters to a plurality of network isolation parameters; and
   running the set of rules against the network access parameters to obtain the network isolation parameter from the plurality of network isolation parameters.

6. The method of claim 5, further comprising applying one or more enforcement rules to the network port of the first network device.

7. The method of claim 6, wherein the one or more enforcement rules comprise traffic access control list rules.

8. The method of claim 7, wherein the traffic access control list rules are based on one or more parameters selected from the group consisting of internet protocol address, protocol identifier, protocol port identifier, physical port identifier, and virtual local area network identifier.

9. The method of claim 1, wherein automatically configuring the network port of the first network device with the network isolation parameter comprises:
   determining a virtual extensible local area network identifier based on the network isolation parameter;
   determining whether a virtual extensible local area network tunnel is open on the network port of the first network device; and
   opening, in response to determining that a virtual extensible local area network tunnel is not open on the network port of the first network device, a virtual extensible local area network tunnel on the network port of the first network device using the virtual extensible local area network identifier.

10. A system for automatically configuring a network port at a first network device with isolation parameters, the system comprising:
   a network isolation engine configured to provide a network isolation parameter based on network access parameters, wherein the network isolation parameter is to be used for a plurality of network packets received at the first network device from a second network device; and
   a network interface configured to:
   receive, on the network port of the first network device, a network access message from the second network device, wherein the network access message comprises the network access parameters, including a first identifier, to be used when the second network device communicates with the first network device;
   retrieve, at the first network device, a mapping of the received first identifier to a second identifier;
   obtain the network isolation parameter from the network isolation engine by communicating the first identifier to the network isolation engine;
   determine, at the first network device, whether the network port is configured with the network isolation parameter;
   in response to determining that the network port of the first network device is not configured with the network isolation parameter, the first network device automatically configures its network port with the network isolation parameter to isolate traffic that does not contain the first identifier;
   subsequent to configuring the network port of the first network device with the network isolation parameter, receive from the second network device a second network access message comprising a disconnect message; and
   in response to receiving the disconnect message, remove the configuration associated with the network isolation parameter from the network port.

11. The system of claim 10, wherein the network access parameters comprise one or more virtual local area network identifiers and wherein the network isolation engine is configured to determine network isolation parameter based on the retrieved mapping comprises performing a lookup of association between the one or more virtual local area network identifiers and one of more virtual extensible local area network identifiers.

12. The system of claim 11, wherein the network isolation engine is further configured to retrieve, from a management server, a data structure comprising a plurality of associations between virtual local area network identifiers and virtual extensible local area network identifiers.

13. The system of claim 10, wherein the network access parameters comprise traffic class information associated with a plurality of network access devices connected to the second network device and wherein the network isolation engine is configured to determine network isolation parameter based on the retrieved mapping by:
   retrieving a mapping between a plurality of traffic classes and a plurality of virtual local area network identifiers; and
   determining which virtual local area network identifiers from the plurality of virtual local area network identifiers are mapped to the one or more traffic classes.

14. The system of claim 10, further comprising the network isolation engine configured to determine network isolation parameter based on the network access parameters by:
   retrieving a set of rules for mapping a plurality of the network access parameters to a plurality of network isolation parameters; and
   running the set of rules against the network access parameters to obtain the network isolation parameter from the plurality of network isolation parameters.

15. The system of claim 14, further comprising applying one or more enforcement rules to the network port of the first network device.

16. The system of claim 15, wherein the one or more enforcement rules comprise traffic access control list rules.

17. The system of claim 16, wherein the traffic access control list rules are based on one or more parameters selected from the group consisting of internet protocol address, protocol identifier, protocol port identifier, physical port identifier, and virtual local area network identifier.

18. The system of claim 10, wherein the network interface is configured to automatically configure the network port of the first network device with the network isolation parameter by:
   determining a virtual extensible local area network identifier based on the network isolation parameter;
   determining whether a virtual extensible local area network tunnel is open on the network port of the first network device; and
   opening, in response to determining that a virtual extensible local area network tunnel is not open on the network port of the first network device, a virtual extensible local area network tunnel on the network port of the first network device using the virtual extensible local area network identifier.

19. The method of claim 1, wherein the first identifier is a Service Set Identifier (SSID) and the second identifier is a Virtual LAN (VLAN).

20. The method of claim 1, wherein the first identifier is selected from a group consisting of Service Set Identifier (SSID), Virtual LAN (VLAN), Virtual LAN ID (VLAN ID), Virtual eXtensible Local Area Network (VxLAN), and VNI.

* * * * *